(12) United States Patent
Li et al.

(10) Patent No.: US 12,389,430 B2
(45) Date of Patent: Aug. 12, 2025

(54) METHOD FOR CONTROLLING WIRELESS RELAY DEVICE AND CORRESPONDING DEVICES

(71) Applicant: Samsung Electronics Co., Ltd., Suwon-si (KR)

(72) Inventors: Yankun Li, Beijing (CN); He Wang, Beijing (CN); Haijie Qiu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 17/633,734

(22) PCT Filed: Aug. 13, 2020

(86) PCT No.: PCT/KR2020/010729
§ 371 (c)(1),
(2) Date: Feb. 8, 2022

(87) PCT Pub. No.: WO2021/029691
PCT Pub. Date: Feb. 18, 2021

(65) Prior Publication Data
US 2022/0369309 A1    Nov. 17, 2022

(30) Foreign Application Priority Data

Aug. 14, 2019 (CN) .......................... 201910749111.5

(51) Int. Cl.
*H04W 72/04* (2023.01)
*H04W 52/36* (2009.01)
(Continued)

(52) U.S. Cl.
CPC ......... *H04W 72/27* (2023.01); *H04W 52/367* (2013.01); *H04W 52/46* (2013.01);
(Continued)

(58) Field of Classification Search
CPC ..... H04W 16/26; H04W 24/02; H04W 48/20; H04W 52/247; H04W 52/365;
(Continued)

(56) References Cited

U.S. PATENT DOCUMENTS 8,875,215 B2* 10/2014 Reisman ............ H04N 21/6587
725/113
10,588,101 B2* 3/2020 Malladi ................. H04W 16/26
(Continued)

FOREIGN PATENT DOCUMENTS

CN        109964419 A     7/2019
CN        110113122 A     8/2019
(Continued)

OTHER PUBLICATIONS

Wang et al., Start-up and Connection Process of 5G IAB Basestation, Communications Technology, vol. 52, No. 4, Apr. 2019.
(Continued)

*Primary Examiner* — Liton Miah
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. There is provided a method for controlling a wireless relay device and corresponding devices. The method includes: obtaining information used to indicate a capability of the wireless relay device; transmitting the obtained information to an upstream wireless relay device of
(Continued)

the wireless relay device or a base station; and receiving control information generated based on the information from the upstream wireless relay device or the base station, wherein the control information is used to control communication of the wireless relay device. According to the method and the corresponding devices, the performance of a mobile communication system may be improved, and the communication efficiency of the mobile communication system may be improved.

20 Claims, 2 Drawing Sheets

(51) Int. Cl.
*H04W 52/46* (2009.01)
*H04W 72/0446* (2023.01)
*H04W 72/0453* (2023.01)
*H04W 72/27* (2023.01)
*H04W 72/51* (2023.01)
*H04W 88/08* (2009.01)

(52) U.S. Cl.
CPC ... *H04W 72/0446* (2013.01); *H04W 72/0453* (2013.01); *H04W 72/51* (2023.01); *H04W 88/08* (2013.01)

(58) Field of Classification Search
CPC ............... H04W 52/367; H04W 52/46; H04W 72/0446; H04W 72/0453; H04W 76/27; H04W 8/24; H04W 84/047; H04W 88/08; H04W 72/27; H04W 72/51; H04W 76/40
See application file for complete search history.

(56) References Cited

U.S. PATENT DOCUMENTS

| | | | |
|---|---|---|---|
| 11,012,840 B2* | 5/2021 | Hou | H04W 4/00 |
| 2013/0040558 A1* | 2/2013 | Kazmi | H04B 7/15507 455/7 |
| 2018/0092139 A1 | 3/2018 | Novlan et al. | |
| 2019/0021084 A1 | 1/2019 | Stirling-Gallacher et al. | |
| 2019/0110268 A1 | 4/2019 | Abedini et al. | |
| 2019/0124696 A1 | 4/2019 | Islam et al. | |
| 2019/0132805 A1 | 5/2019 | Abedini et al. | |
| 2019/0182140 A1 | 6/2019 | Tenny et al. | |
| 2019/0223002 A1 | 7/2019 | Novlan et al. | |
| 2019/0223078 A1 | 7/2019 | Sirotkin et al. | |
| 2019/0268817 A1* | 8/2019 | Seo | H04W 84/04 |
| 2019/0379450 A1* | 12/2019 | Kamei | H04W 40/10 |
| 2020/0383073 A1 | 12/2020 | Liu et al. | |
| 2020/0404571 A1* | 12/2020 | Lin | H04W 8/005 |
| 2022/0132388 A1* | 4/2022 | Ishii | H04W 76/19 |

FOREIGN PATENT DOCUMENTS

| | | |
|---|---|---|
| GB | 201804821 A | 10/2019 |
| GB | 201906212 A | 4/2020 |
| KR | 10-2002-0076104 A | 10/2002 |

OTHER PUBLICATIONS

Telecommunications Technology, Issue 08, Research on 5G network base station wireless backhaul technology, Aug. 2018.
Vivo, Enhancements to support NR backhaul link, R1, 1812305, 3GPP TSG RAN WG1 Meeting #95, Nov. 2018.
Polese et al., End-to-End Simulation of Integrated Access and Backhaul at mmWaves, 2018 IEEE 23rd International Workshop on Computer Aided Modeling and Design of Communication Links and Networks (CAMAD), Sep. 2018.
Chinese Office Action dated May 16, 2024, issued in Chinese Application No. 201910749111.5.
Huawei, 'Integration of IAB Node', R3-192803, 3GPP TSG-RAN WG3 Meeting #104, Reno, Nevada, USA, May 3, 2019.
Samsung, 'Further discussion on IAB node indication', R3-192602, 3GPP TSG-RAN WG2 Meeting #104, Reno, NV, USA, May 2, 2019.
Ericsson, 'IAB-node Indication', R3-192421, 3GPP TSG-RAN WG3 Meeting #104, Reno, NV, USA, May 3, 2019.
ZTE Corporation et al., 'Discussion on IAB node impact to CN', R3-192516, 3GPP TSG RAN WG3 Meeting #104, Reno, USA, May 4, 2019.
3GPP TS 36.116 V15.0.0 (Sep. 2018), 3rd Generation Partnership Project; Technical Specification Group Radio Access Network; Evolved Universal Terrestrial Radio Access (E-UTRA); Relay radio transmission and reception (Release 15).
3GPP TS 36.306 V15.5.0 (Jun. 2019), 3rd Generation Partnership Project; Technical Specification Group Radio Access Network; Evolved Universal Terrestrial Radio Access (E-UTRA); User Equipment (UE) radio access capabilities (Release 15).
3GPP TS 38.306 V15.6.0 (Jun. 2019), 3rd Generation Partnership Project; Technical Specification Group Radio Access Network; NR; User Equipment (UE) radio access capabilities (Release 15).
Chinese Office Action dated Dec. 3, 2024, issued in Chinese Application No. 201910749111.5.
Chinese Office Action dated Mar. 10, 2025, issued in Chinese Application No. 2019107491115.
Rejection Decision dated May 30, 2025, issued in Chinese Application No. 201910749111.5.

* cited by examiner

[Fig. 1]
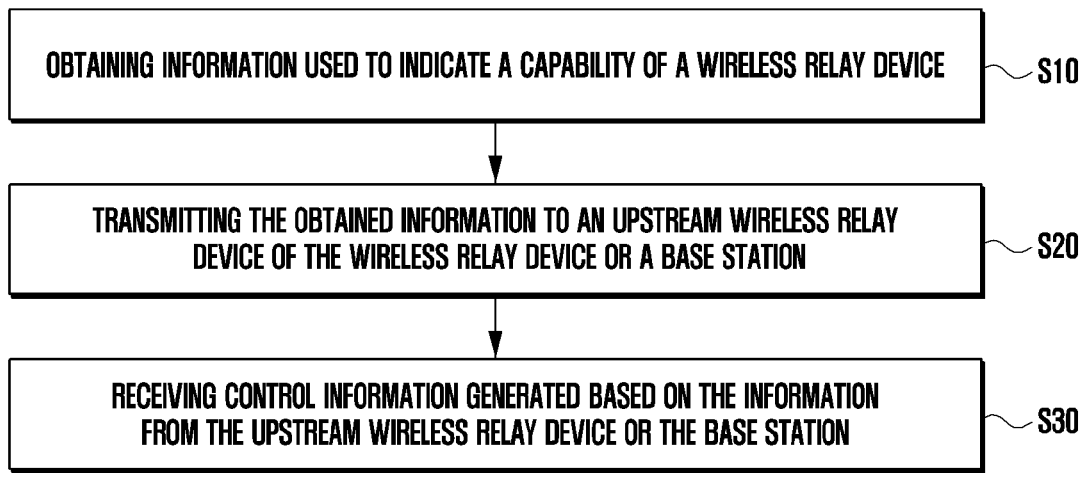
[Fig. 2]
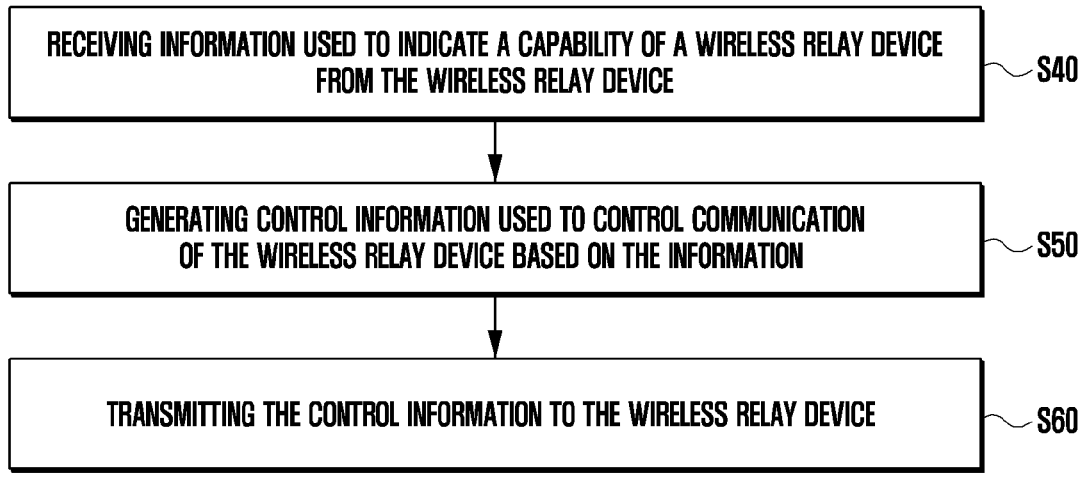
[Fig. 3]
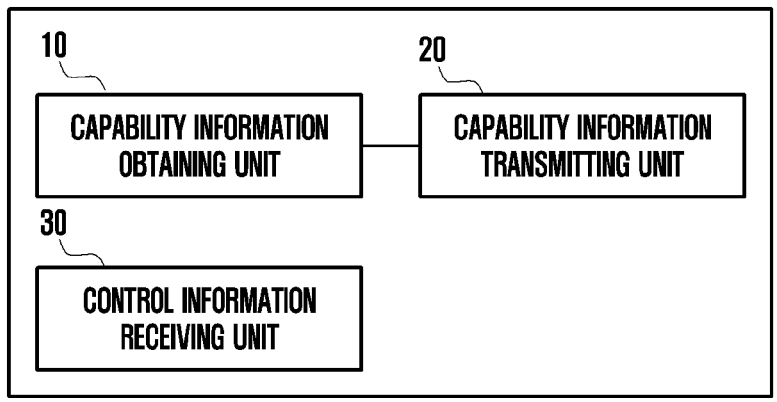

[Fig. 4]
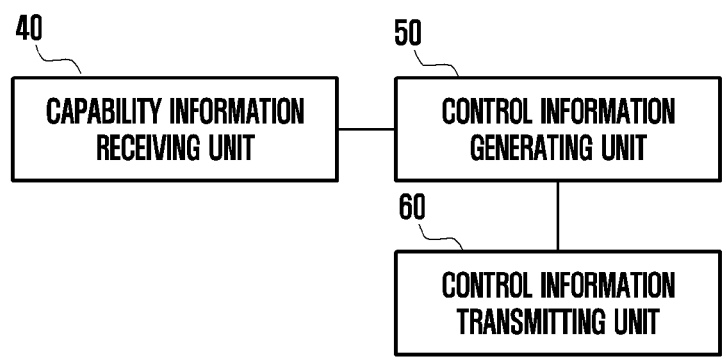

METHOD FOR CONTROLLING WIRELESS RELAY DEVICE AND CORRESPONDING DEVICES

TECHNICAL FIELD

The present disclosure generally relates to a technical field of wireless communication, and more particularly to a method for controlling a wireless relay device and corresponding devices.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In wireless communication technology, a wireless relay device in a mobile communication system may serve as a device that effectively improves system capacity and extends system coverage, which can effectively assist and supplement the communication between a base station equipment and a user equipment UE. With respect to long term evolution (LTE) system, a technical specification TS36.116 of the International Organization for Standardization 3GPP specifies a radio frequency index of the wireless relay device in the LTE phase, in which only one conductive power class, i.e., 23 dBm, is defined with respect to a backhaul link of the wireless relay device. This is also maximum transmitting power commonly used by a common user equipment in the LTE phase. In the LTE phase, 3GPP only standardizes the fixed wireless relay device, and the wireless relay device may access a core network through two hops through a donor base station (BS). The LTE phase only considers using frequency bands lower than 6 GHz. In this frequency range, the wireless relay device does not consider the introduction of an active array antenna or a beamforming technique, so that it is not widely used in the practical application.

With the explosion of demand for high-bandwidth mobile communication services of users, mobile communication operators have begun to consider using higher frequency bands (even millimeter wave frequency bands) higher than 6 GHz as one of main operating frequency bands of the next-generation mobile communication system. In these high frequency bands, there are relatively more spectrum resources that can be allocated by countries in the world to be used by mobile communication, so that the huge demand for high-bandwidth mobile communication services of the users in various countries can be satisfied. In order to adapt to this trend, 3GPP has completed the formulation of the first version of a standardized specification for a new generation of radio communication technology (new radio, NR). In order to support the smooth and successful evolution of the mobile communication system, in the NR phase, in addition to introducing the aforementioned millimeter wave frequency bands, frequency bands lower than the frequency range 1 (FR1: 450 MHz-7.125 GHz) are also extended according to frequency re-farming of the operators and planned frequency spectrums of respective regions. However, since propagation losses of the millimeter waves are large, and the propagation is easily affected by weather and environment changes, a coverage range and a data rate calculated and derived based on its link budget theory have been significantly reduced compared with the existing network coverage range and high data rate. This brings many practical problems to network coverage and network deployment of the communication, especially the increase in cost. For this problem, 3GPP is currently conducting research and discussion on an integrated access and backhaul (IAB) link device project, which may be regarded as a discussion of the wireless relay device evolved in the NR phase. In the discussion of a current version, a consensus of 3GPP is that the Integrated Access and Backhaul device will greatly facilitate the flexible and dense deployment of millimeter waves, which may also greatly save the high cost that may be brought by the deployment of wired cables while improving the network coverage and the data capacity. Furthermore, due to the full introduction of the beamforming technique, the feasibility and possibility of applying the Integrated Access and Backhaul device to FR1 have also been greatly improved. Therefore, in the current discussion of 3GPP, FR1 and FR2 (24.25-52.6 GHz) are both in the frequency range supported by the IAB. At the same time, in band IAB and out of band IAB are also under discussion. In addition, the IAB currently under discussion is concentrated on the IAB in a fixed location, supports multiple hops to eventually access the core network through the BS via a plurality of IABs, and has a half-duplex limitation.

In the LTE phase, with respect to UE capabilities provided by different UEs, capability items that the UE may need to report are defined in a UE-EUTRA-Capability Information Element (IE) specified by the 3GPP TS36.306 specification, and the UE needs to report the related capabilities that may be supported thereby to a serving cell according to a method in the 3GPP specification. In the NR phase, this mode is still used, and the capability items that the NR UE needs to report are defined in the UEEUTRA-Capability Information Element specified by the 3GPP TS38.306 specification.

DISCLOSURE OF INVENTION

Technical Problem

In order to support the smooth and successful evolution of the mobile communication system, in the NR phase, in addition to introducing the aforementioned millimeter wave frequency bands, frequency bands lower than the frequency range 1 (FR1: 450 MHz-7.125 GHz) are also extended according to frequency re-farming of the operators and planned frequency spectrums of respective regions. However, since propagation losses of the millimeter waves are large, and the propagation is easily affected by weather and environment changes, a coverage range and a data rate calculated and derived based on its link budget theory have been significantly reduced compared with the existing network coverage range and high data rate. This brings many practical problems to network coverage and network deployment of the communication, especially the increase in cost.

Solution to Problem

The exemplary embodiments of the present disclosure lie in providing a method for controlling a wireless relay device and corresponding devices, which may report information used to indicate a capability of the wireless relay device, so that an upstream wireless relay device or a base station performs an effective scheduling.

According to an exemplary embodiment of the present disclosure, there is provided a method for controlling a wireless relay device, wherein the method includes: obtaining information used to indicate the capability of the wireless relay device; transmitting the obtained information to an upstream wireless relay device or a base station of the wireless relay device; and receiving control information from the upstream wireless relay device or the base station, wherein the control information is used to control communication of the wireless relay device and generated based on the information by the upstream wireless relay device or the base station.

According to another exemplary embodiment of the present disclosure, there is provided a method for controlling a wireless relay device, wherein the method includes: receiving information used to indicate a capability of the wireless relay device from the wireless relay device; generating control information used to control communication of the wireless relay device based on the information; and transmitting the control information to the wireless relay device.

According to another exemplary embodiment of the present disclosure, there is provided a wireless relay device, including: a capability information obtaining unit for obtaining information used to indicate a capability of the wireless relay device; a capability information transmitting unit for transmitting the obtained information to an upstream wireless relay device of the wireless relay device or a base station; and a control information receiving unit for receiving control information from the upstream wireless relay device or the base station, wherein the control information is used to control communication of the wireless relay device and generated based on the information by the upstream wireless relay device or the base station.

Advantageous Effects of Invention

According to the method for controlling the wireless relay device and corresponding devices of the exemplary embodiments of the present disclosure, the information used to indicate the capability of the wireless relay device may be reported, so that the upstream wireless relay device or the base station performs an effective scheduling, thereby improving the performance of a mobile communication system and the communication efficiency of the mobile communication system.

BRIEF DESCRIPTION OF DRAWINGS

The above and other purposes and features of the exemplary embodiments of the present disclosure will become clearer, from the descriptions in combination with the accompanying drawings below, which exemplarily illustrate the embodiments, and in which:

FIG. 1 shows a flowchart of a method for controlling a wireless relay device according to an exemplary embodiment of the present disclosure;

FIG. 2 shows a flowchart of a method for controlling a wireless relay device according to another exemplary embodiment of the present disclosure;

FIG. 3 shows a block diagram of a wireless relay device according to an exemplary embodiment of the present disclosure;

FIG. 4 shows a block diagram of a device for controlling a wireless relay device according to an exemplary embodiment of the present disclosure.

MODE FOR THE INVENTION

In wireless communication technology, a wireless relay device in a mobile communication system may serve as a device that effectively improves system capacity and extends system coverage, which can effectively assist and supplement the communication between a base station equipment and a user equipment UE. With respect to Long Term Evolution (LTE) system, a technical specification TS36.116 of the International Organization for Standardization 3GPP specifies a radio frequency index of the wireless relay device in the LTE phase, in which only one conductive power class, i.e., 23 dBm, is defined with respect to a backhaul link of the wireless relay device. This is also maximum transmitting power commonly used by a common user equipment in the LTE phase. In the LTE phase, 3GPP only standardizes the fixed wireless relay device, and the wireless relay device may access a core network through two hops through a donor base station (BS). The LTE phase only considers using frequency bands lower than 6 GHz. In this frequency range, the wireless relay device does not consider the introduction of an active array antenna or a beamforming technique, so that it is not widely used in the practical application.

With the explosion of demand for high-bandwidth mobile communication services of users, mobile communication operators have begun to consider using higher frequency bands (even millimeter wave frequency bands) higher than 6 GHz as one of main operating frequency bands of the next-generation mobile communication system. In these high frequency bands, there are relatively more spectrum resources that can be allocated by countries in the world to be used by mobile communication, so that the huge demand for high-bandwidth mobile communication services of the users in various countries can be satisfied. In order to adapt to this trend, 3GPP has completed the formulation of the first version of a standardized specification for a new generation of radio communication technology (New Radio, NR). In order to support the smooth and successful evolution of the mobile communication system, in the NR phase, in addition to introducing the aforementioned millimeter wave frequency bands, frequency bands lower than the frequency range 1 (FR1: 450 MHz-7.125 GHz) are also extended according to frequency re-farming of the operators and planned frequency spectrums of respective regions. However, since propagation losses of the millimeter waves are large, and the propagation is easily affected by weather and environment changes, a coverage range and a data rate calculated and derived based on its link budget theory have been significantly reduced compared with the existing network coverage range and high data rate. This brings many practical problems to network coverage and network deployment of the communication, especially the increase in cost. For this problem, 3GPP is currently conducting research and discussion on an Integrated Access and Backhaul (IAB) link device project, which may be regarded as a discussion of the wireless relay device evolved in the NR phase. In the discussion of a current version, a consensus of 3GPP is that the Integrated Access and Backhaul device will greatly facilitate the flexible and dense deployment of millimeter waves, which may also greatly save the high cost that may be brought by the deployment of wired cables while improving the network coverage and the data capacity. Furthermore, due to the full introduction of the beamforming technique, the feasibility and possibility of applying the Integrated Access and Backhaul device to FR1 have also been greatly improved. Therefore, in the current discussion of 3GPP, FR1 and FR2 (24.25-52.6 GHz) are both in the frequency range supported by the IAB. At the same time, in band IAB and out of band IAB are also under discussion. In addition, the IAB currently under discussion is concentrated on the IAB in a fixed location, supports multiple hops to eventually access the core network through the BS via a plurality of IABs, and has a half-duplex limitation.

In the LTE phase, with respect to UE capabilities provided by different UEs, capability items that the UE may need to report are defined in a UE-EUTRA-Capability Information Element (IE) specified by the 3GPP TS36.306 specification, and the UE needs to report the related capabilities that may be supported thereby to a serving cell according to a method in the 3GPP specification. In the NR phase, this mode is still used, and the capability items that the NR UE needs to report are defined in the UE-EUTRA-Capability Information Element specified by the 3GPP TS38.306 specification.

The exemplary embodiments of the present disclosure lie in providing a method for controlling a wireless relay device and corresponding devices, which may report information used to indicate a capability of the wireless relay device, so that an upstream wireless relay device or a base station performs an effective scheduling.

According to an exemplary embodiment of the present disclosure, there is provided a method for controlling a wireless relay device, wherein the method includes: obtaining information used to indicate the capability of the wireless relay device; transmitting the obtained information to an upstream wireless relay device or a base station of the wireless relay device; and receiving control information from the upstream wireless relay device or the base station, wherein the control information is used to control communication of the wireless relay device and generated based on the information by the upstream wireless relay device or the base station.

Alternatively, the control information is used to control at least one of: an upstream link or a downstream link of the wireless relay device, and a cell search method about the upstream link of the wireless relay device, wherein the downstream link is a communication link between the wireless relay device and a downstream wireless relay device or user equipment, and the upstream link is the communication link between the wireless relay device and the upstream wireless relay device or the base station.

Alternatively, the information used to indicate the capability of the wireless relay device includes: information used to indicate a communication capability of the wireless relay device or information used to indicate a mobility capability of the wireless relay device.

Alternatively, the information used to indicate the communication capability of the wireless relay device includes at least one of: information used to indicate a capability related to duplex or frequency band supported by the wireless relay device and information used to indicate a capability related to transmitting power of the wireless relay device; or, the information used to indicate the mobility capability of the wireless relay device includes at least one of: information used to indicate whether mobility is supported, information used to indicate a moving speed capability, and information used to indicate a capability to measure an adjacent cell.

Alternatively, the information used to indicate the capability related to duplex or frequency band supported by the wireless relay device includes at least one of: information used to indicate a duplex type of the wireless relay device; information used to indicate a capability of simultaneously receiving or transmitting on the upstream link or the downstream link; information used to indicate a frequency operating band supported by the upstream link or the downstream link; and information used to indicate as an out of band or in band wireless relay device, wherein the information used to indicate the capability related to the transmitting power of the wireless relay device includes at least one of: information used to indicate whether controlling the transmitting power of the upstream link or the downstream link is supported; information used to indicate a range of the transmitting power supported on the upstream link or the downstream link; information used to indicate a range of the transmitting power supported by the whole wireless relay device; information used to indicate whether simultaneously transmitting on the upstream link and the downstream link is supported; information used to indicate whether the upstream link and the downstream link share a power resource pool; information used to indicate whether the wireless relay device shares a power resource pool among a plurality of cells covered thereby; information used to indicate a power back-off range of the upstream link or the downstream link with respect to a specific modulation mode; and information used to indicate a power back-off range of the whole wireless relay device with respect to the specific modulation mode.

Alternatively, the control information includes at least one of: information used to control a radio resource allocation, information used to control transmitting power or a modulation mode, and information used to control a measurement number or a measurement period with respect to the adjacent cell on the upstream link, wherein the method further includes: controlling communication of the wireless relay device based on the control information, wherein the controlling the communication of the wireless relay device based on the control information includes: allocating wireless time or frequency resources used by the upstream link or the downstream link of the wireless relay device based on the information used to control the radio resource allocation, wherein the information used to control the radio resource allocation is generated based on the information used to indicate the capability related to duplex or frequency band supported by the wireless relay device or information used to indicate the capability related to the transmitting power of the wireless relay device; or, controlling the transmitting power or the modulation mode of the upstream link or the downstream link of the wireless relay device based on the information used to control the transmitting power or the modulation mode, wherein the information used to control the transmitting power or the modulation mode is generated based on the information used to indicate the capability related to duplex or frequency band supported by the wireless relay device or information used to indicate the capability related to the transmitting power of the wireless relay device; or, controlling the number or the period of measuring the adjacent cell on the upstream link of the wireless relay device based on the information used to control the measurement number or the measurement period with respect to the adjacent cell on the upstream link, wherein the information used to control the measurement number or the measurement period with respect to the adjacent cell on the upstream link is generated based on the information used to indicate the mobility capability of the wireless relay device.

Alternatively, the information used to control the radio resource allocation includes at least one of: information used to indicate frequency resources allowed to be used by the upstream link; information used to indicate frequency resources allowed to be used by the downstream link; information used to indicate allowed transmission or reception timing of the upstream link and the downstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitation, and a uplink and downlink priority on the downstream link; information used to indicate a priority of the upstream link and the downstream link; and information used to indicate prohibiting transmitting in an uplink time slot of the upstream link, wherein the information used to control the transmitting power or the modulation mode includes at least one of: information used to indicate allowed maximum total radiated power TRP when the wireless relay device transmits on the upstream link or the downstream link; information used to indicate allowed maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

Alternatively, the allocating the wireless time or frequency resources used by the upstream link or downstream link of the wireless relay device based on the information used to control the radio resource allocation includes: determining an allowed range of an operating frequency of the upstream link of the wireless relay device based on the information used to indicate the frequency resources allowed to be used by the upstream link; or, determining an allowed range of an operating frequency of the downstream link of the wireless relay device based on the information used to indicate the frequency resources allowed to be used by the downstream link; or controlling timing of transmitting or receiving on the upstream link or the downstream link of the wireless relay device based on at least one of the information used to indicate the allowed transmission or reception timing of the upstream link and the downstream link, the information used to indicate at least one of the allowed uplink and downlink timing, the uplink and downlink limitation, and the uplink and downlink priority on the upstream link, the information used to indicate at least one of the allowed uplink and downlink timing, the uplink and downlink limitation and the uplink and downlink priority on the downstream link, and the information used to indicate the priority of the upstream link and the downstream link; or, controlling the wireless relay device to transmit in a downlink time slot of the upstream link based on the information used to indicate prohibiting transmitting in the uplink time slot of the upstream link, wherein the controlling the transmitting power or the modulation mode of the upstream link or the downstream link of the wireless relay device based on the information used to control the transmitting power or the modulation mode includes: determining maximum transmitting power allowed on the upstream link or the downstream link of the wireless relay device based on the information used to indicate the allowed maximum total radiated power TRP when the wireless relay device transmits on the upstream link or the downstream link; or, determining the maximum transmitting power allowed on the upstream link or the downstream link of the wireless relay device based on the information used to indicate the allowed maximum equivalent isotropic radiated power EIRP when the wireless relay device transmits on the upstream link or the downstream link; or, adjusting actual transmitting power on the upstream link or the downstream link of the wireless relay device based on the information used to indicate that the wireless relay device is required to adjust the transmitting power on the upstream link or the downstream link; or, determining the modulation mode on the upstream link or the downstream link of the wireless relay device based on the information used to indicate the modulation mode allowed on the upstream link or the downstream link of the wireless relay device.

Alternatively, the method further includes: receiving a request message requesting the information used to indicate the capability of the wireless relay device from the upstream wireless relay device or the base station, wherein the procedure of obtaining the information used to indicate the capability of the wireless relay device is performed according to the request message.

Alternatively, the request message is used to request: information used to indicate a capability of the wireless relay device in at least one specified operation condition or scenario.

Alternatively, the request message is carried on a broadcast signaling or a radio resource configuration RRC message.

Alternatively, the control information is carried on one of a broadcast signaling, a RRC message, and media intervention control information.

Alternatively, the wireless relay device is an Integrated Access and Backhaul IAB device.

According to another exemplary embodiment of the present disclosure, there is provided a method for controlling a wireless relay device, wherein the method includes: receiving information used to indicate a capability of the wireless relay device from the wireless relay device; generating control information used to control communication of the wireless relay device based on the information; and transmitting the control information to the wireless relay device.

Alternatively, the control information is used to control at least one of: an upstream link or a downstream link of the wireless relay device, and a cell search method about the upstream link of the wireless relay device, wherein the downstream link is a communication link between the wireless relay device and a downstream wireless relay device or user equipment, and the upstream link is the communication link between the wireless relay device and a device performing the method.

Alternatively, the information used to indicate the capability of the wireless relay device includes: information used to indicate a communication capability of the wireless relay device or information used to indicate a mobility capability of the wireless relay device.

Alternatively, the information used to indicate the communication capability of the wireless relay device includes at least one of: information used to indicate a capability related to duplex or frequency band supported by the wireless relay device and information used to indicate a capability related to transmitting power of the wireless relay device; or, the information used to indicate the mobility capability of the wireless relay device includes at least one of: information used to indicate whether mobility is supported, information used to indicate a moving speed capability, and information used to indicate a capability to measure an adjacent cell.

Alternatively, the generating control information used to control communication of the wireless relay device based on the information includes: generating information used to control a radio resource allocation based on the information used to indicate the capability related to duplex or frequency band supported by the wireless relay device or the information used to indicate the capability related to the transmitting power of the wireless relay device; or, generating information used to control transmitting power or a modulation mode based on the information used to indicate the capability related to duplex or frequency band supported by the wireless relay device or information used to indicate the capability related to the transmitting power of the wireless relay device mode; or, generating information used to control a measurement number or a measurement period with respect to the adjacent cell on the upstream link based on the information used to indicate the mobility capability of the wireless relay device.

Alternatively, the information used to control the radio resource allocation includes at least one of: information used to indicate frequency resources allowed to be used by the upstream link; information used to indicate frequency resources allowed to be used by the downstream link; information used to indicate allowed transmission or reception timing of the upstream link and the downstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitation, and a uplink and downlink priority on the downstream link; information used to indicate a priority of the upstream link and the downstream link; and information used to indicate prohibiting transmitting in an uplink time slot of the upstream link, wherein the information used to control the transmitting power or the modulation mode includes at least one of: information used to indicate allowed maximum total radiated power TRP when the wireless relay device transmits on the upstream link or the downstream link; information used to indicate allowed maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

Alternatively, the method further includes: transmitting a request message requesting the information used to indicate the capability of the wireless relay device to the wireless relay device.

Alternatively, the request message is used to request: information used to indicate a capability of the wireless relay device in at least one specified operation condition or scenario.

Alternatively, the request message is carried on a broadcast signaling or a radio resource configuration RRC message.

Alternatively, the control information is carried on one of a broadcast signaling, a RRC message, and media intervention control information.

Alternatively, the information used to indicate the capability related to duplex or frequency band supported by the wireless relay device includes at least one of: information used to indicate the duplex type of the wireless relay device; information used to indicate a capability of simultaneously receiving or transmitting on the upstream link or the downstream link; information used to indicate a frequency operating band supported by the upstream link or the downstream link; and information used to indicate as an out of band or in band wireless relay device, wherein the information used to indicate the capability related to the transmitting power of the wireless relay device includes at least one of: information used to indicate whether controlling the transmitting power of the upstream link or the downstream link is supported; information used to indicate a range of the transmitting power supported on the upstream link or the downstream link; information used to indicate a range of the transmitting power supported by the whole wireless relay device; information used to indicate whether simultaneously transmitting on the upstream link and the downstream link is supported; information used to indicate whether the upstream link and the downstream link share a power resource pool; information used to indicate whether the wireless relay device shares a power resource pool among a plurality of cells covered thereby; information used to indicate a power back-off range of the upstream link or the downstream link with respect to a specific modulation mode;

and information used to indicate a power back-off range of the whole wireless relay device with respect to the specific modulation mode.

According to another exemplary embodiment of the present disclosure, there is provided a wireless relay device, including: a capability information obtaining unit for obtaining information used to indicate a capability of the wireless relay device; a capability information transmitting unit for transmitting the obtained information to an upstream wireless relay device of the wireless relay device or a base station; and a control information receiving unit for receiving control information from the upstream wireless relay device or the base station, wherein the control information is used to control communication of the wireless relay device and generated based on the information by the upstream wireless relay device or the base station.

Alternatively, the control information is used to control at least one of: an upstream link or a downstream link of the wireless relay device, and a cell search method about the upstream link of the wireless relay device, wherein the downstream link is a communication link between the wireless relay device and a downstream wireless relay device or user equipment, and the upstream link is the communication link between the wireless relay device and the upstream wireless relay device or the base station.

Alternatively, the information used to indicate the capability of the wireless relay device includes: information used to indicate a communication capability of the wireless relay device or information used to indicate a mobility capability of the wireless relay device.

Alternatively, the information used to indicate the communication capability of the wireless relay device includes at least one of: information used to indicate a capability related to duplex or frequency band supported by the wireless relay device and information used to indicate a capability related to transmitting power of the wireless relay device; or, the information used to indicate the mobility capability of the wireless relay device includes at least one of: information used to indicate whether mobility is supported, information used to indicate a moving speed capability, and information used to indicate a capability to measure an adjacent cell.

Alternatively, the information used to indicate the capability related to duplex or frequency band supported by the wireless relay device includes at least one of: information used to indicate the duplex type of the wireless relay device; information used to indicate a capability of simultaneously receiving or transmitting on the upstream link or the downstream link; information used to indicate a frequency operating band supported by the upstream link or the downstream link; and information used to indicate as an out of band or in band wireless relay device, wherein the information used to indicate the capability related to the transmitting power of the wireless relay device includes at least one of: information used to indicate whether controlling the transmitting power of the upstream link or the downstream link is supported; information used to indicate a range of the transmitting power supported on the upstream link or the downstream link; information used to indicate a range of the transmitting power supported by the whole wireless relay device; information used to indicate whether simultaneously transmitting on the upstream link and the downstream link is supported; information used to indicate whether the upstream link and the downstream link share a power resource pool; information used to indicate whether the wireless relay device shares a power resource pool among a plurality of cells covered thereby; information used to indicate a power back-off range of the upstream link or the downstream link with respect to a specific modulation mode; and information used to indicate a power back-off range of the whole wireless relay device with respect to the specific modulation mode.

Alternatively, the control information includes at least one of: information used to control a radio resource allocation, information used to control transmitting power or a modulation mode, and information used to control a measurement number or a measurement period with respect to the adjacent cell on the upstream link, wherein the wireless relay device further includes: a control unit for controlling communication of the wireless relay device based on the control information, wherein the control unit allocates wireless time or frequency resources used by the upstream link or the downstream link of the wireless relay device based on the information used to control the radio resource allocation, wherein the information used to control the radio resource allocation is generated based on the information used to indicate the capability related to duplex or frequency band supported by the wireless relay device or information used to indicate the capability related to the transmitting power of the wireless relay device; or, the control unit controls the transmitting power or the modulation mode of the upstream link or the downstream link of the wireless relay device based on the information used to control the transmitting power or the modulation mode, wherein the information used to control the transmitting power or the modulation mode is generated based on the information used to indicate the capability related to duplex or frequency band supported by the wireless relay device or information used to indicate the capability related to the transmitting power of the wireless relay device; or, the control unit controls the number or the period of measuring the adjacent cell on the upstream link of the wireless relay device based on the information used to control the measurement number or the measurement period with respect to the adjacent cell on the upstream link, wherein the information used to control the measurement number or the measurement period with respect to the adjacent cell on the upstream link is generated based on the information used to indicate the mobility capability of the wireless relay device.

Alternatively, the information used to control the radio resource allocation includes at least one of: information used to indicate frequency resources allowed to be used by the upstream link; information used to indicate frequency resources allowed to be used by the downstream link; information used to indicate allowed transmission or reception timing of the upstream link and the downstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitation, and a uplink and downlink priority on the downstream link; information used to indicate a priority of the upstream link and the downstream link; and information used to indicate prohibiting transmitting in an uplink time slot of the upstream link, wherein the information used to control the transmitting power or the modulation mode includes at least one of: information used to indicate allowed maximum total radiated power TRP when the wireless relay device transmits on the upstream link or the downstream link; information used to indicate allowed maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

Alternatively, the control unit determines an allowed range of an operating frequency of the upstream link of the wireless relay device based on the information used to indicate the frequency resources allowed to be used by the upstream link; or, the control unit determines an allowed range of an operating frequency of the downstream link of the wireless relay device based on the information used to indicate the frequency resources allowed to be used by the downstream link; or the control unit controls timing of transmitting or receiving on the upstream link or the downstream link of the wireless relay device based on at least one of the information used to indicate the allowed transmission or reception timing of the upstream link and the downstream link, the information used to indicate at least one of the allowed uplink and downlink timing, the uplink and downlink limitation, and the uplink and downlink priority on the upstream link, the information used to indicate at least one of the allowed uplink and downlink timing, the uplink and downlink limitation, and the uplink and downlink priority on the downstream link, and the information used to indicate the priority of the upstream link and the downstream link; or, the control unit controls the wireless relay device to transmit in a downlink time slot of the upstream link control unit based on the information used to indicate prohibiting transmitting in the uplink time slot of the upstream link, or, the control unit determines maximum transmitting power allowed on the upstream link or the downstream link of the wireless relay device based on the information used to indicate the allowed maximum total radiated power TRP when the wireless relay device transmits on the upstream link or the downstream link; or, the control unit determines the maximum transmitting power allowed on the upstream link or the downstream link of the wireless relay device based on the information used to indicate the allowed maximum equivalent isotropic radiated power EIRP when the wireless relay device transmits on the upstream link or the downstream link; or, the control unit adjusts actual transmitting power on the upstream link or the downstream link of the wireless relay device based on the information used to indicate that the wireless relay device is required to adjust the transmitting power on the upstream link or the downstream link; or, the control unit determines the modulation mode on the upstream link or the downstream link of the wireless relay device based on the information used to indicate the modulation mode allowed on the upstream link or the downstream link of the wireless relay device.

Alternatively, the wireless relay device further includes: a request message receiving unit for receiving a request message requesting the information used to indicate the capability of the wireless relay device from the upstream wireless relay device or the base station, wherein the capability information obtaining unit obtains the information used to indicate the capability of the wireless relay device in response to the request message.

Alternatively, the request message is used to request: information used to indicate a capability of the wireless relay device in at least one specified operation condition or scenario.

Alternatively, the request message is carried on a broadcast signaling or a radio resource configuration RRC message.

Alternatively, the control information is carried on one of a broadcast signaling, a RRC message, and media intervention control information.

Alternatively, the wireless relay device is an Integrated Access and Backhaul IAB device.

According to another exemplary embodiment of the present disclosure, there is provided a device for controlling a wireless relay device, including: a capability information receiving unit for receiving information used to indicate a capability of the wireless relay device from the wireless relay device; a control information generating unit for generating control information used to control communication of the wireless relay device based on the information; and a control information transmitting unit for transmitting the control information to the wireless relay device.

Alternatively, the control information is used to control at least one of: an upstream link or a downstream link of the wireless relay device, and a cell search method about the upstream link of the wireless relay device, wherein the downstream link is a communication link between the wireless relay device and the downstream wireless relay device or user equipment, and the upstream link is the communication link between the wireless relay device and the device.

Alternatively, the information used to indicate the capability of the wireless relay device includes: information used to indicate a communication capability of the wireless relay device or information used to indicate a mobility capability of the wireless relay device.

Alternatively, the information used to indicate the communication capability of the wireless relay device includes at least one of: information used to indicate a capability related to duplex or frequency band supported by the wireless relay device and information used to indicate a capability related to transmitting power of the wireless relay device; or, the information used to indicate the mobility capability of the wireless relay device includes at least one of: information used to indicate whether mobility is supported, information used to indicate a moving speed capability, and information used to indicate a capability to measure an adjacent cell.

Alternatively, the control information generating unit generates information used to control a radio resource allocation based on the information used to indicate the capability related to duplex or frequency band supported by the wireless relay device or information used to indicate the capability related to the transmitting power of the wireless relay device; or, the control information generating unit generates information used to control transmitting power or a modulation mode based on the information used to indicate the capability related to duplex or frequency band supported by the wireless relay device or information used to indicate the capability related to the transmitting power of the wireless relay device mode; or, the control information generating unit generates information used to control a measurement number or a measurement period with respect to the adjacent cell on the upstream link based on the information used to indicate the mobility capability of the wireless relay device.

Alternatively, the information used to control the radio resource allocation includes at least one of: information used to indicate frequency resources allowed to be used by the upstream link; information used to indicate frequency resources allowed to be used by the downstream link; information used to indicate allowed transmission or reception timing of the upstream link and the downstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitation, and a uplink and downlink priority on the downstream link; information used to indicate a priority of the upstream link and the downstream link; and information used to indicate prohibiting transmitting in an uplink time slot of the upstream link, wherein the information used to control the transmitting power or the modulation mode includes at least one of: information used to indicate allowed maximum total radiated power TRP when the wireless relay device transmits on the upstream link or the downstream link; information used to indicate allowed maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

Alternately, the device further includes: a request message transmitting unit transmitting a request message requesting the information used to indicate the capability of the wireless relay device to the wireless relay device.

Alternatively, the request message is used to request: information used to indicate a capability of the wireless relay device in at least one specified operation condition or scenario.

Alternatively, the request message is carried on a broadcast signaling or a radio resource configuration RRC message.

Alternatively, the control information is carried on one of a broadcast signaling, a RRC message, and media intervention control information.

Alternatively, the information used to indicate the capability related to duplex or frequency band supported by the wireless relay device includes at least one of: information used to indicate the duplex type of the wireless relay device; information used to indicate a capability of simultaneously receiving or transmitting on the upstream link or the downstream link; information used to indicate a frequency operating band supported by the upstream link or the downstream link; and information used to indicate as an out of band or in band wireless relay device, wherein the information used to indicate the capability related to the transmitting power of the wireless relay device includes at least one of: information used to indicate whether controlling the transmitting power of the upstream link or the downstream link is supported; information used to indicate a range of the transmitting power supported on the upstream link or the downstream link; information used to indicate a range of the transmitting power supported by the whole wireless relay device; information used to indicate whether simultaneously transmitting on the upstream link and the downstream link is supported; information used to indicate whether the upstream link and the downstream link share a power resource pool; information used to indicate whether the wireless relay device shares a power resource pool among a plurality of cells covered thereby; information used to indicate a power back-off range of the upstream link or the downstream link with respect to a specific modulation mode; and information used to indicate a power back-off range of the whole wireless relay device with respect to the specific modulation mode.

According to another exemplary embodiment of the present disclosure, there is provided a computer-readable storage medium for storing a computer program, wherein when the computer program is executed by a controller, the method for controlling a wireless relay device as mentioned above is implemented.

According to another exemplary embodiment of the present disclosure, there is provided a wireless relay device, wherein the wireless relay device includes: a controller; a storage storing a computer program, wherein when the computer program is executed by a controller, the method for controlling a wireless relay device as mentioned above is implemented.

According to another exemplary embodiment of the present disclosure, there is provided a base station, wherein the base station includes: a controller; a storage storing a computer program, wherein when the computer program is executed by a controller, the method for controlling a wireless relay device as mentioned above is implemented.

According to the method for controlling the wireless relay device and corresponding devices of the exemplary embodiments of the present disclosure, the information used to indicate the capability of the wireless relay device may be reported, so that the upstream wireless relay device or the base station performs an effective scheduling, thereby improving the performance of a mobile communication system and the communication efficiency of the mobile communication system.

Another aspect or advantage of the general concept of the present disclosure will be partly explained in the following descriptions, and in part, will be clear through the descriptions, or may be learned through the practice of the general concept of the present disclosure.

The above and other purposes and features of the exemplary embodiments of the present disclosure will become clearer, from the descriptions in combination with the accompanying drawings below, which exemplarily illustrate the embodiments, and in which:

FIG. 1 shows a flowchart of a method for controlling a wireless relay device according to an exemplary embodiment of the present disclosure;

FIG. 2 shows a flowchart of a method for controlling a wireless relay device according to another exemplary embodiment of the present disclosure;

FIG. 3 shows a block diagram of a wireless relay device according to an exemplary embodiment of the present disclosure;

FIG. 4 shows a block diagram of a device for controlling a wireless relay device according to an exemplary embodiment of the present disclosure.

The embodiment of the present disclosure, an example of which is illustrated in the accompany drawings will now be referred to in detail, wherein the same reference numeral indicates the same part throughout the accompany drawings. The embodiment will be illustrated below with reference to the accompanying drawings, so as to explain the present disclosure.

Embodiment I

FIG. 1 shows a flowchart of a method for controlling a wireless relay device according to an exemplary embodiment of the present disclosure. The method may be performed by the wireless relay device, here, the wireless relay device may be a relay device used for wireless access and backhaul in a mobile communication system, as an example, the wireless relay device may be an Integrated Access and Backhaul (IAB) device.

Referring to FIG. 1, in step S10, information used to indicate a capability of the wireless relay device is obtained.

As an example, the information used to indicate the capability of the wireless relay device may include: information used to indicate a communication capability of the wireless relay device or information used to indicate a mobility capability of the wireless relay device. It should be understood that the information used to indicate the capability of the wireless relay device may include information used to indicate other types of capabilities of the wireless relay device, for example, the other types of capabilities may be multiplexed or integrated capability items that need to be reported by a user equipment, or a specific type of capability with respect to the wireless relay device.

As an example, the information used to indicate the capability of the wireless relay device may be determined according to the design, radio frequency hardware, and a base band capability of the wireless relay device itself.

As an example, the information used to indicate the communication capability of the wireless relay device may include at least one of: information used to indicate a capability related to duplex or frequency band supported by the wireless relay device and information used to indicate a capability related to transmitting power of the wireless relay device. As an example, the capability related to duplex or frequency band supported by the wireless relay device may refer to a maximum capability in a duplex aspect or a frequency operating band supporting aspect that can be achieved by the wireless relay device; and the capability related to the transmitting power of the wireless relay device may refer to the maximum capability in a transmitting power aspect that can be achieved by the wireless relay device. As a preferred example, the information used to indicate the capability related to duplex or frequency band supported by the wireless relay device will be described in detail in embodiment II, and the information used to indicate the capability related to the transmitting power of the wireless relay device will be described in detail in embodiment III.

As an example, the information used to indicate the mobility capability of the wireless relay device may include at least one of: information used to indicate whether the wireless relay device supports mobility, information used to indicate a moving speed capability, and information used to indicate a capability to measure an adjacent cell of the wireless relay device. Here, the moving speed capability may refer to a maximum moving speed that may be supported by the wireless relay device.

In step S20, the obtained information is transmitted to an upstream wireless relay device of the wireless relay device or a base station.

As an example, the upstream wireless relay device may be an upper level wireless relay device of the current wireless relay device, for example a Direction toward parent node in IAB-topology or parent IAB of the current IAB.

As an example, when the current wireless relay device has the upstream wireless relay device, the obtained information may be transmitted to the upstream wireless relay device; and when the current wireless relay device does not have the upstream wireless relay device, the obtained information may be directly transmitted to a corresponding base station (e.g., a donor base station).

As an example, the method for controlling the wireless relay device according to the exemplary embodiment of the present disclosure may also include: receiving a request message requesting the information used to indicate the capability of the wireless relay device from the upstream wireless relay device or the base station, wherein the step S10 is performed in response to the request message.

As an example, the request message may be used to request: information used to indicate a capability of the wireless relay device in at least one specified operation condition or scenario. In addition, the request message may also specify requesting specific information used to indicate a capability in a specific aspect of the wireless relay device.

Correspondingly, in the step S10, the information used to indicate the capability of the wireless relay device specifically requested by the request message may be obtained in response to the request message. For example, the information used to indicate a capability of the wireless relay device in the at least one specified operation condition or scenario may be obtained.

As an example, the operation condition or scenario may be defined by at least one of: a transmitting mode, bandwidth and time-frequency resource scheduling information, an OTA measurement parameter, and a method for post-processing data.

As an example, the request message may be carried on a broadcast signaling or a radio resource configuration RRC message. As an example, the request message may be similar to RRC signaling information used for UE Capability Enquiry adopted in an LTE, LTE-A or NR system, and also may be RRC signaling information dedicated to request the capability of the wireless relay device.

As an example, the information used to indicate the capability of the wireless relay device may be carried on a radio resource configuration RRC message, so as to be transmitted to the upstream wireless relay device or the base station. As an example, the information used to indicate the capability of the wireless relay device may be carried on the information similar to RRC signaling information carrying UE Capability Information adopted in the LTE, LTE-A or NR system, and also may be reported by using RRC signaling information dedicated to report the information used to indicate the capability of the wireless relay device.

In step S30, control information generated based on the information is received from the upstream wireless relay device or the base station, wherein the control information is used to control communication of the wireless relay device.

As an example, the control information may be carried on one of a broadcast signaling, a RRC message, and media intervention control information. As an example, the received information carrying the control information may be similar to a system information block adopted in the LTE, LTE-A or NR system.

As an example, the control information may include a control parameter or a control instruction.

As an example, the control information may be used to control at least one of: an upstream link or a downstream link of the wireless relay device, and a cell search method about the upstream link of the wireless relay device.

Here, the downstream link is a communication link between the wireless relay device and a downstream wireless relay device or user equipment, and the upstream link is the communication link between the wireless relay device and the upstream wireless relay device or the base station.

It should be understood that the upstream link is a backhaul link between the wireless relay device and the upstream wireless relay device or the base station, moreover, when the downstream link is the communication link between the wireless relay device and the terminal user equipment, the downstream link is an access link between the wireless relay device and the terminal user equipment;

and when the downstream link is the communication link between the wireless relay device and the downstream wireless relay device, the downstream link is the backhaul link between the wireless relay device and the downstream wireless relay device (e.g., the child IAB of the current IAB). It should be understood that the upstream link may include a receiving link and a transmitting link between the wireless relay device and the upstream wireless relay device thereof or the base station; and the downstream link may include the receiving link and the transmitting link between the wireless relay device and the downstream wireless relay device thereof or the user equipment.

As an example, the method for controlling the wireless relay device according to the exemplary embodiment of the present disclosure may also include: controlling the communication of the wireless relay device based on the control information.

As an example, the upstream link or the downstream link of the wireless relay device may be controlled based on the control information, or, the cell search method about the upstream link of the wireless relay device may be controlled based on the control information. It should be understood that other aspects of the communication of the wireless relay device may be controlled based on the control information.

Specifically speaking, while transmitting the obtained information to the upstream wireless relay device of the wireless relay device in the step S20, the communication link between the wireless relay device and the upstream wireless relay device may be controlled based on the control information; and while transmitting the obtained information to the base station corresponding to the wireless relay device in the step S20, the communication link between the wireless relay device and the base station may be controlled based on the control information.

As an example, the control information may include at least one of: information used to control a radio resource allocation, information used to control transmitting power or a modulation coding mode, and information used to control a measurement number or a measurement period with respect to the adjacent cell on the upstream link, wherein the information used to control the radio resource allocation is generated based on the information used to indicate the capability related to duplex or frequency band supported by the wireless relay device or information used to indicate the capability related to the transmitting power of the wireless relay device, the information used to control the transmitting power or the modulation mode is generated based on the information used to indicate the capability related to duplex or frequency band supported by the wireless relay device or information used to indicate the capability related to the transmitting power of the wireless relay device, and the information used to control the measurement number or the measurement period with respect to the adjacent cell on the upstream link is generated based on the information used to indicate the mobility capability of the wireless relay device.

As an example, wireless time or frequency resources used by the upstream link or the downstream link of the wireless relay device may be allocated based on the information used to control the radio resource allocation, so as to perform a corresponding transmission or reception operation by using the allocated resources; or, the transmitting power or the modulation coding mode of the upstream link or the downstream link of the wireless relay device may be controlled based on the information used to control the transmitting power or the modulation mode, so as to perform a corresponding transmitting operation on the upstream link or the downstream link according to the controlled transmitting power or the modulation coding mode. As a preferable example, the operation of allocating the wireless time or frequency resources used by the upstream link or the downstream link of the wireless relay device based on the information used to control the radio resource allocation will be described in detail in embodiment II; and the operation of controlling the transmitting power or the modulation coding mode of the upstream link or the downstream link of the wireless relay device based on the information used to control the transmitting power or the modulation mode will be described in detail in embodiment III.

As an example, the number or the period of measuring the adjacent cell on the upstream link of the wireless relay device may be controlled based on the information used to control the measurement number or the measurement period with respect to the adjacent cell on the upstream link.

As an example, the information used to control the radio resource allocation may include a control parameter or a control instruction with respect to the time-frequency resource scheduling. As an example, the information used to control the radio resource allocation may be the information used to control a scheduling range of the time-frequency resource of the wireless relay device, for example, it may be respective uplink and downlink configuration parameters of the upstream link and the downstream link, and for example, timing of receiving and transmitting may be controlled based on the uplink and downlink configuration parameters.

As an example, the information used to control the transmitting power or the modulation coding mode may include a control parameter or a control instruction with respect to the transmitting power. As an example, the information used to control the transmitting power or the modulation coding mode may be used to adjust a value of the transmitting power or define maximum transmitting power during a process of controlling the transmitting power such as opening and closing loop and the like.

According to the exemplary embodiment of the present disclosure, reporting the information used to indicate the capability of the wireless relay device to the upstream wireless relay device or the base station may facilitate the upstream wireless relay device or the base station to perform a power control scheduling, a wireless time-frequency resource scheduling and a configuration of mobility measurement on the wireless relay device, effectively save a signaling overhead, improve the scheduling efficiency of the mobile communication system, improve the multiplexing efficiency of the operating time-frequency resource of the wireless relay device, and improve a control and management effect of the transmitting power of the wireless relay device.

Embodiment II

An exemplary embodiment about the information used to indicate the capability related to duplex or frequency band supported by a wireless relay device will be described in detail below.

As an example, the information used to indicate the capability related to duplex or frequency band supported by the wireless relay device includes at least one of:

information used to indicate the duplex type of the wireless relay device;

information used to indicate a capability of simultaneously receiving or transmitting on the upstream link or the downstream link;

information used to indicate a frequency operating band supported by the upstream link or the downstream link; and information used to indicate that the wireless relay device belongs to an out of band or in band wireless relay device.

Specifically speaking, as an example, the duplex type may include, but not limited to: a full duplex, a quasi-full duplex (or a limited full duplex), and a half-duplex.

As an example, the information used to indicate the capability of simultaneously receiving and transmitting on the upstream link or the downstream link may indicate a maximum capability of simultaneously receiving and transmitting on the upstream link or the downstream link that can be achieved by the wireless relay device. For example, the type of the capability of simultaneously receiving and transmitting on the upstream link or the downstream link may include, but not limited to: a capability only capable of receiving or transmitting on the downstream link, or transmitting or receiving on the upstream link, a capability of simultaneously transmitting on both the downstream link and the upstream link, a capability of simultaneously receiving on both the downstream link and the upstream link, a capability of simultaneously receiving and transmitting on the upstream link, a capability of simultaneously receiving and transmitting on the downstream link, and a capability of simultaneously receiving and transmitting on both the downstream link and the upstream link (i.e., a capability of simultaneously receiving and transmitting on the upstream link and receiving and transmitting on the downstream link).

It should be understood that one kind of information of the above information further implicitly indicate another kind of information, thus, based on one kind of information of the above received information, the upstream wireless relay device or the base station may obtain the content directly or implicitly indicated thereby.

As an example, the information used to indicate as the out of band or in band wireless relay device may further implicitly indicate the duplex type of the wireless relay device, for example, since the downstream link and the upstream link of the out of band wireless relay device support different frequency ranges or frequency ranges that do not completely coincide, the information used to indicate as the out of band wireless relay device may further implicitly indicate as full duplex type or at least as quasi-full duplex type; and accordingly, the information used to indicate only as the in band wireless relay device may further implicitly indicate as the half-duplex type. Thus, even if the information used to indicate as the out of band or in band wireless relay device is transmitted to the upstream wireless relay device or the base station, and the information used to indicate the duplex type of the wireless relay device is not transmitted, the upstream wireless relay device or the base station may also obtain the duplex type of the wireless relay device.

As an example, the information used to indicate the duplex type of the wireless relay device may further implicitly indicate the capability of simultaneously receiving and transmitting on the downstream link or the upstream link, accordingly, the information used to indicate the capability of simultaneously receiving and transmitting on the downstream link or the upstream link may further implicitly indicate the duplex type of the wireless relay device. The information used to indicate the frequency operating band supported by the downstream link and the upstream link may further implicitly indicate that the wireless relay device belongs to the out of band or in band wireless relay device, and the duplex type of the wireless relay device.

For example, the information used to indicate as the full duplex may further implicitly indicate the capability of simultaneously receiving and transmitting on both the downstream link and the upstream link; the information used to indicate as the quasi-full duplex may further implicitly indicate the capability of simultaneously transmitting on both the downstream link and the upstream link, or the capability of simultaneously receiving on both the downstream link and the upstream link; and the information used to indicate as the half-duplex may further implicitly indicate the capability only capable of simultaneously receiving or transmitting on the upstream link, or transmitting or receiving on the downstream link. Thus, even if the information used to indicate the duplex type of the wireless relay device is transmitted to the upstream wireless relay device or the base station, and the information used to indicate the capability of simultaneously receiving and transmitting on the downstream link or the upstream link is not transmitted, the upstream wireless relay device or the base station may also obtain the capability of simultaneously receiving and transmitting on the downstream link or the upstream link of the wireless relay device.

Accordingly, as an example, the information used to control the radio resource allocation generated based on the information used to indicate the duplex capability of the wireless relay device may include:

information used to indicate the frequency resources (e.g., a frequency operating band, a carrier frequency or BWP) allowed to be used by the upstream link;

information used to indicate the frequency resources allowed to be used by the downstream link;

information used to indicate allowed transmission or reception timing of the downstream link and the upstream link;

information used to indicate at least one of allowed uplink and downlink timing, a uplink and downlink limitation, and a uplink and downlink priority on the upstream link;

information used to indicate at least one of allowed uplink and downlink timing, a uplink and downlink limitation, and a uplink and downlink priority on the downstream link;

information used to indicate a priority of the upstream link and the downstream link; and information used to indicate prohibiting transmitting in an uplink time slot of the upstream link.

As an example, the information used to indicate allowed transmission or reception timing of the downstream link and the upstream link may include at least one of:

information used to indicate allowing to simultaneously schedule the upstream link to perform both receiving and transmitting while performing both receiving and transmitting on the downstream link;

information used to indicate allowing to simultaneously schedule the downstream link to perform both receiving and transmitting while performing both receiving and transmitting on the upstream link;

information used to indicate allowing to simultaneously schedule the downstream link to perform receiving while performing transmitting on the upstream link;

information used to indicate allowing to simultaneously schedule the downstream link to perform transmitting while performing transmitting on the upstream link;

information used to indicate allowing to simultaneously schedule the downstream link to perform transmitting while performing receiving on the upstream link;

information used to indicate allowing to simultaneously schedule the downstream link to perform receiving while performing receiving on the upstream link;

information used to indicate allowing to simultaneously schedule the upstream link to perform transmitting while performing transmitting on the downstream link;

information used to indicate allowing to simultaneously schedule the upstream link to perform receiving while performing transmitting on the downstream link;

information used to indicate allowing to simultaneously schedule the upstream link to perform transmitting while performing receiving on the downstream link; and information used to indicate allowing to simultaneously schedule the upstream link to perform receiving while performing receiving on the downstream link.

As an example, the information used to indicate the uplink and downlink timing allowed on the upstream link may include at least one of: information used to indicate allowing to simultaneously schedule the upstream link to perform receiving while performing transmitting on the upstream link; and information used to indicate allowing to simultaneously schedule the upstream link to perform transmitting while performing receiving on the upstream link.

As an example, when the wireless relay device has a power control capability on the upstream link, the information used to indicate the uplink and downlink limitation on the upstream link may include: if transmitting on the uplink, related power control adjustment information is provided according to the needs, and if transmitting on the downlink, the power control adjustment information is not needed; and when the wireless relay device does not have the power control capability on the upstream link, the information used to indicate the uplink and downlink limitation on the upstream link may include: transmitting on the downlink is limited.

As an example, when the duplex type of the wireless relay device is the half-duplex, the information used to indicate the uplink and downlink priority on the upstream link may indicate that the uplink is prior or the downlink is prior on the upstream link.

As an example, the information used to indicate a priority of the upstream link and the downstream link may indicate that, if specific configurations conflict on the upstream link and the downstream link, the upstream link is prior or the downstream link is prior between the two links.

As an example, the information used to indicate the uplink and downlink timing allowed on the downstream link may include at least one of: information used to indicate allowing to simultaneously schedule the downstream link to perform receiving while performing transmitting on the downstream link; and information used to indicate allowing to simultaneously schedule the downstream link to perform transmitting while performing receiving on the downstream link.

As an example, when the wireless relay device has a power control capability on the downstream link, the information used to indicate the uplink and downlink limitation on the downstream link may include: according to a network deployment, if working in a nonsynchronous TDD system, uplink and downlink configurations of the downstream link may be different compared with those of a surrounding system, so as to perform interference elimination control by reducing the power.

As an example, when the duplex type of the wireless relay device is the half-duplex, the information used to indicate the uplink and downlink priority on the downstream link may indicate that the uplink is prior or the downlink is prior on the downstream link.

As an example, the information used to indicate prohibiting transmitting in an uplink time slot of the upstream link may indicate only allowing to perform transmitting in a downlink time slot of the upstream link. If the wireless relay device does not have a capability of controlling and adjusting the power of the upstream link, prohibiting transmitting in the uplink time slot of the upstream link may avoid interference to other systems. For example, interference to mobile communication systems normally deployed on a surrounding adjacent channel or secondary adjacent channel may be avoided or limited.

As an example, the allowed range of the operating frequency of the upstream link of the wireless relay device may be determined based on the information used to indicate the frequency resources allowed to be used by the upstream link.

As an example, the allowed range of the operating frequency of the downstream link of the wireless relay device may be determined based on the information used to indicate the frequency resources allowed to be used by the downstream link.

As an example, the timing of transmitting or receiving on the upstream link or the downstream link of the wireless relay device may be controlled based on at least one of the information used to indicate the allowed transmission or reception timing of the downstream link and the upstream link, the information used to indicate at least one of the allowed uplink and downlink timing, the uplink and downlink limitation, and the uplink and downlink priority on the upstream link, the information used to indicate at least one of the allowed uplink and downlink timing, the uplink and downlink limitation, and the uplink and downlink priority on the downstream link, and the information used to indicate the priority of the upstream link and the downstream link.

As an example, the wireless relay device to transmit in the downlink time slot of the upstream link may be controlled based on the information used to indicate prohibiting transmitting in the uplink time slot of the upstream link.

According to the exemplary embodiment II of the present disclosure, reporting the information used to indicate the capability of the wireless relay device to the upstream wireless relay device or the base station may facilitate the upstream wireless relay device or the base station to perform a wireless time-frequency resource scheduling on the wireless relay device, effectively save a signaling overhead, improve the scheduling efficiency of the mobile communication system, improve the multiplexing efficiency of the operating time-frequency resource of the wireless relay device, and improve the flexibility of the deployment of the wireless relay device and the coordination control of the system interference.

Embodiment III

An exemplary embodiment about information used to indicate the capability related to transmitting power of a wireless relay device will be described in detail below.

As an example, the information used to indicate the capability related to the transmitting power of the wireless relay device may include at least one of:

information used to indicate whether controlling the transmitting power of the downstream link or the upstream link is supported (i.e., whether there is a power control capability on the downstream link or upstream link (e.g., a power control capability required in a RF specification index, or adjusting an output power spectral density according to a power adjustment instruction of an upstream wireless relay device or a base station));

information used to indicate a range of the transmitting power supported on the downstream link or the upstream link;

information used to indicate a range of the transmitting power supported by the whole wireless relay device;

information used to indicate whether simultaneously transmitting on the upstream link and the downstream link is supported;

information used to indicate whether the upstream link and the downstream link share a power resource pool;

information used to indicate whether the wireless relay device shares a power resource pool among a plurality of cells covered thereby;

information used to indicate a power back-off range of the downstream link or the upstream link with respect to a specific modulation mode; and information used to indicate a power back-off range of the whole wireless relay device with respect to the specific modulation mode.

As an example, the information used to indicate the range of the transmitting power supported on the downstream link may indicate a maximum value that can be achieved by the transmitting power of the downstream link, or a power range or a power class corresponding to the maximum value.

As an example, the information used to indicate the range of the transmitting power supported on the upstream link may indicate a maximum value that can be achieved by the transmitting power of the upstream link, or a power range or a power class corresponding to the maximum value.

As an example, when the upstream link and the downstream link share the power resource pool, the information used to indicate the range of the transmitting power supported by the whole wireless relay device may indicate the range of the transmitting power supported by the whole downstream link and the upstream link.

As an example, the specific modulation mode may include a 64QAM modulation mode or a 256QAM modulation mode. It should be understood that the specific modulation mode may also be other modulation coding modes.

As an example, when the wireless relay device supports simultaneously transmitting on both the downstream link and the upstream link and sharing one power resource pool, it may result in that a back-off situation of the transmitting power range reported thereby may occur when the wireless relay device works in a simultaneously transmitting state. Thus, reporting the information used to indicate the power back-off range of the whole wireless relay device with respect to the specific modulation mode, the information used to indicate supporting simultaneously transmitting on both the upstream link and the downstream link, the information used to indicate the range of the transmitting power supported by the whole wireless relay device and the information used to indicate that the upstream link and the downstream link share the power resource pool, may make the upstream wireless relay device or the base station determine an actual power capability of the wireless relay device, on the one hand, it may be used to control the transmitting power of the wireless relay device, and on the other hand, it may be used for evaluation in the scheduling of the upstream wireless relay device or the base station to prevent the adjustment to the wireless relay device MSC from causing the connection to exceed an ideal link budget thereby being unable to effectively sustain the current connection.

Accordingly, as an example, the information used to control the transmitting power or the modulation mode includes at least one of:

information used to indicate allowed maximum total radiated power (TRP) when the wireless relay device transmits on the upstream link or the downstream link;

information used to indicate allowed maximum equivalent isotropic radiated power (EIRP) when the wireless relay device transmits on the upstream link or the downstream link;

information used to indicate that the wireless relay device is required to adjust the transmitting power; and information used to indicate the modulation mode allowed on the upstream link or the downstream link of the wireless relay device.

As an example, maximum transmitting power allowed on the upstream link or the downstream link of the wireless relay device may be determined based on the information used to indicate the allowed maximum total radiated power (TRP) when the wireless relay device transmits on the upstream link or the downstream link. That is, the transmitting power is limited according to the information used to indicate the allowed maximum total radiated power TRP when the wireless relay device transmits on the upstream link or the downstream link.

As an example, the maximum transmitting power allowed on the upstream link or the downstream link of the wireless relay device may be determined based on the information used to indicate the allowed maximum equivalent isotropic radiated power EIRP when the wireless relay device transmits on the upstream link or the downstream link. That is, the transmitting power is limited according to the information used to indicate the allowed maximum equivalent isotropic radiated power EIRP when the wireless relay device transmits on the upstream link or the downstream link.

As an example, an actual transmitting power on the upstream link or the downstream of the wireless relay device may be adjusted based on the information used to indicate that the wireless relay device is required to adjust the transmitting power on the upstream link or the downstream link, for example, the original transmitting power value is increased or decreased, or a new transmitting power value is set as the actual transmitting power value.

As an example, the modulation mode on the upstream link or the downstream link of the wireless relay device may be determined based on the information used to indicate the modulation mode allowed on the upstream link or the downstream link of the wireless relay device.

According to the exemplary embodiment III of the present disclosure, reporting the information used to indicate the capability related to the transmitting power of the wireless relay device to the upstream wireless relay device or the base station, may facilitate the upstream wireless relay device or the base station to perform a power control scheduling and coordinate a wireless time-frequency resource scheduling on the wireless relay device, effectively save a signaling overhead, improve the scheduling efficiency of the mobile communication system, improve the multiplexing efficiency of the operating time-frequency resource of the wireless relay device, and improve a control and management effect of the transmitting power of the wireless relay device.

Embodiment IV

FIG. 2 shows a flowchart of a method for controlling a wireless relay device according to another exemplary embodiment of the present disclosure. The method may be performed by an upstream wireless relay device of the wireless relay device or a base station.

Referring to FIG. 2, in step S40, information used to indicate a capability of the wireless relay device is received from the wireless relay device.

As an example, the information used to indicate the capability of the wireless relay device may include: information used to indicate a communication capability of the wireless relay device or information used to indicate a mobility capability of the wireless relay device.

As an example, the information used to indicate the communication capability of the wireless relay device may include at least one of: information used to indicate a capability related to duplex or frequency band supported by the wireless relay device and information used to indicate a capability related to transmitting power of the wireless relay device; or, the information used to indicate the mobility capability of the wireless relay device may include at least one of: information used to indicate whether mobility is supported, information used to indicate a moving speed capability, and information used to indicate a capability to measure an adjacent cell.

As an example, the information used to indicate the capability related to duplex or frequency band supported by the wireless relay device may include at least one of:
information used to indicate a duplex type of the wireless relay device;
information used to indicate a capability of simultaneously receiving or transmitting on the upstream link or the downstream link;
information used to indicate a frequency operating band supported by the upstream link or the downstream link; and
information used to indicate as an out of band or in band wireless relay device.

As an example, the information used to indicate the capability related to the transmitting power of the wireless relay device may include at least one of:
information used to indicate whether controlling the transmitting power of the upstream link or the downstream link is supported;
information used to indicate a range of the transmitting power supported on the upstream link or the downstream link;
information used to indicate a range of the transmitting power supported by the whole wireless relay device;
information used to indicate whether simultaneously transmitting on the upstream link and the downstream link is supported;
information used to indicate whether the upstream link and the downstream link share a power resource pool;
information used to indicate whether the wireless relay device shares a power resource pool among a plurality of cells covered thereby;
information used to indicate a power back-off range of the upstream link or the downstream link with respect to a specific modulation mode; and
information used to indicate a power back-off range of the whole wireless relay device with respect to the specific modulation mode.

In step S50, control information used to control communication of the wireless relay device is generated based on the information.

As an example, the control information may be used to control at least one of: an upstream link or a downstream link of the wireless relay device, and a cell search method about the upstream link of the wireless relay device, wherein the downstream link is a communication link between the wireless relay device and a downstream wireless relay device or user equipment, and the upstream link is the communication link between the wireless relay device and a device performing the method.

As an example, the information used to control a radio resource allocation may be generated based on the information used to indicate the capability related to duplex or frequency band supported by the wireless relay device or the information used to indicate the capability related to the transmitting power of the wireless relay device.

As an example, the information used to control the radio resource allocation may include at least one of: information used to indicate frequency resources allowed to be used by the upstream link; information used to indicate frequency resources allowed to be used by the downstream link; information used to indicate allowed transmission or reception timing of the downstream link and the upstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitation, and a uplink and downlink priority on the downstream link; information used to indicate a priority of the upstream link and the downstream link; and information used to indicate prohibiting transmitting in an uplink time slot of the upstream link.

As an example, when the wireless relay device works in a certain operation condition or scenario, the upstream wireless relay device or the base station limits the time-frequency resources scheduling of the transmitting of the wireless relay device in some specified situations to avoid interference to other systems, and whether it is necessary to transmit related control information of the time-frequency resources scheduling to the wireless relay device depends on whether the wireless relay device supports power control on the downstream link or the upstream link. Thus, the information used to control the radio resource allocation may be generated based on the information used to indicate supporting controlling the transmitting power of the upstream link or the downstream link.

As an example, the information used to control the transmitting power or the modulation mode may be generated based on the information used to indicate the capability related to duplex or frequency band supported by the wireless relay device or the information used to indicate the capability related to transmitting power of the wireless relay device mode.

As an example, the information used to control the transmitting power or the modulation mode may include at least one of: information used to indicate allowed maximum total radiated power TRP when the wireless relay device transmits on the upstream link or the downstream link; information used to allowed indicate maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

As an example, whether it is necessary to transmit a value of the maximum total radiated power or a value of the total radiated power on a certain link or a value of the total radiated power in a certain coverage direction of the wireless relay device that can be allowed by the base station or the upstream wireless relay device depends on whether the wireless relay device supports the power control on the downstream link or the upstream link. Thus, the information used to control the transmitting power may be generated based on the information used to indicate supporting controlling the transmitting power of the upstream link or the downstream link.

If the wireless relay device does not have a capability of controlling and adjusting the power of the upstream link, by prohibiting transmitting in the uplink time slot of the upstream link, interference to other systems may be avoided, and thus, the information used to indicate prohibiting transmitting in the uplink time slot of the upstream link may be generated based on the information used to indicate supporting controlling the transmitting power of the upstream link.

As an example, the information used to control the transmitting power of the downstream link may be determined based on the information used to indicate the range of the transmitting power of the downstream link and the information used to indicate the power back-off range of the downstream link with respect to the specific modulation mode.

As an example, information used to control a measurement number or a measurement period with respect to an adjacent cell on the upstream link may be generated based on the information used to indicate the mobility capability of the wireless relay device.

As an example, the control information used to control communication of the wireless relay device may be generated based on the information and other related information. As an example, the other information may include, but not limited to, at least one of: a related system configuration parameter of a cell where the wireless relay device resides, service requirements and priorities of other wireless relay devices or user equipments in the cell.

In step S60, the control information is transmitted to the wireless relay device.

As an example, the method for controlling the wireless relay device according to another exemplary embodiment of the present disclosure may also include: transmitting a request message requesting the information used to indicate the capability of the wireless relay device to the wireless relay device.

As an example, the request message may be used to request: information used to indicate a capability of the wireless relay device in at least one specified operation condition or scenario.

As an example, the request message may be carried on a broadcast signaling or a radio resource configuration RRC message.

As an example, the control information may be carried on one of a broadcast signaling, a RRC message, and media intervention control information.

According to the exemplary embodiment IV of the present disclosure, the upstream wireless relay device or the base station specifically request for the information of the capability of the wireless relay device, and the capability information may facilitate the upstream wireless relay device or the base station to perform a power control scheduling, a wireless time-frequency resource scheduling and a configuration of mobility measurement on the wireless relay device, effectively save a signaling overhead, improve the scheduling efficiency of the mobile communication system, improve the multiplexing efficiency of the operating time-frequency resource of the wireless relay device, and improve a control and management effect of the transmitting power of the wireless relay device and an overall system interference coordination effect.

Embodiment V

FIG. 3 shows a block diagram of a wireless relay device according to an exemplary embodiment of the present disclosure.

As shown in FIG. 3, the wireless relay device according to the exemplary embodiment of the present disclosure includes: a capability information obtaining unit 10, a capability information transmitting unit 20 and a control information receiving unit 30.

Specifically speaking, the capability information obtaining unit 10 is used to obtain information used to indicate a capability of the wireless relay device.

The capability information transmitting unit 20 is used to transmit the obtained information to an upstream wireless relay device of the wireless relay device or a base station.

The control information receiving unit 30 is used to receive control information from the upstream wireless relay device or the base station, wherein the control information is used to control communication of the wireless relay device and generated based on the information by the upstream wireless relay device or the base station.

As an example, the control information may be used to control at least one of: an upstream link or a downstream link of the wireless relay device, and a cell search method about the upstream link of the wireless relay device, wherein the downstream link is a communication link between the wireless relay device and a downstream wireless relay device or user equipment, and the upstream link is the communication link between the wireless relay device and the upstream wireless relay device or the base station.

As an example, the information used to indicate the capability of the wireless relay device may include: information used to indicate a communication capability of the wireless relay device or information used to indicate a mobility capability of the wireless relay device.

As an example, the information used to indicate the communication capability of the wireless relay device may include at least one of: information used to indicate a capability related to duplex or frequency band supported by the wireless relay device and information used to indicate a capability related to transmitting power of the wireless relay device; or, the information used to indicate the mobility capability of the wireless relay device may include at least one of: information used to indicate whether mobility is supported, information used to indicate a moving speed capability, and information used to indicate a capability to measure an adjacent cell.

As an example, the information used to indicate the capability related to duplex or frequency band supported by the wireless relay device may include at least one of: information used to indicate the duplex type of the wireless relay device; information used to indicate a capability of simultaneously receiving or transmitting on the upstream link or the downstream link; information used to indicate a frequency operating band supported by the upstream link or the downstream link; and information used to indicate as an out of band or in band wireless relay device.

As an example, the information used to indicate the capability related to the transmitting power of the wireless relay device may include at least one of: information used to indicate whether controlling the transmitting power of the upstream link or the downstream link is supported; information used to indicate a range of the transmitting power supported on the upstream link or the downstream link; information used to indicate the range of the transmitting power supported by the whole wireless relay device; information used to indicate whether simultaneously transmitting on the upstream link and the downstream link is supported; information used to indicate whether the upstream link and the downstream link share a power resource pool; information used to indicate whether the wireless relay device shares a power resource pool among a plurality of cells covered thereby; information used to indicate a power back-off range of the upstream link or the downstream link with respect to a specific modulation mode; and information used to indicate a power back-off range of the whole wireless relay device with respect to the specific modulation mode.

As an example, the control information may include at least one of: information used to control a radio resource allocation, information used to control transmitting power or a modulation mode, and information used to control a measurement number or a measurement period with respect to the adjacent cell on the upstream link.

As an example, the wireless relay device may further include: a control unit (not shown) used to control communication of the wireless relay device based on the control information.

As an example, the control unit may allocate wireless time or frequency resources used by the upstream link or the downstream link of the wireless relay device based on the information used to control the radio resource allocation, wherein the information used to control the radio resource allocation is generated based on the information used to indicate the capability related to duplex or frequency band supported by the wireless relay device or information used to indicate the capability related to the transmitting power of the wireless relay device; or, the control unit may control the transmitting power or the modulation mode of the upstream link or the downstream link of the wireless relay device based on the information used to control the transmitting power or the modulation mode, wherein the information used to control the transmitting power or the modulation mode is generated based on the information used to indicate the capability related to duplex or frequency band supported by the wireless relay device or information used to indicate the capability related to the transmitting power of the wireless relay device; or, the control unit may control the number or the period of measuring the adjacent cell on the upstream link of the wireless relay device based on the information used to control the measurement number or the measurement period with respect to the adjacent cell on the upstream link, and wherein the information used to control the measurement number or the measurement period with respect to the adjacent cell on the upstream link is generated based on the information used to indicate the mobility capability of the wireless relay device.

As an example, the information used to control the radio resource allocation may include at least one of: information used to indicate frequency resources allowed to be used by the upstream link; information used to indicate frequency resources allowed to be used by the downstream link; information used to indicate allowed transmission or reception timing of the upstream link and the downstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitations, and a uplink and downlink priority on the downstream link; information used to indicate a priority of the upstream link and the downstream link; and information used to indicate prohibiting transmitting in an uplink time slot of the upstream link.

As an example, the information used to control the transmitting power or the modulation mode may include at least one of: information used to indicate allowed maximum total radiated power TRP when the wireless relay device transmits on the upstream link or the downstream link; information used to indicate allowed maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

As an example, the control unit may determine an allowed range of an operating frequency of the upstream link of the wireless relay device based on the information used to indicate the frequency resources allowed to be used by the upstream link; or, the control unit may determine an allowed range of an operating frequency of the downstream link of the wireless relay device based on the information used to indicate the frequency resources allowed to be used by the downstream link; or the control unit may control the timing of transmitting or receiving on the upstream link or the downstream link of the wireless relay device based on at least one of the information used to indicate the allowed transmission or reception timing of the upstream link and the downstream link, the information used to indicate at least one of the allowed uplink and downlink timing, the uplink and downlink limitation, and the uplink and downlink priority on the upstream link, the information used to indicate at least one of the allowed uplink and downlink timing, the uplink and downlink limitation, and the uplink and downlink priority on the downstream link, and the information used to indicate the priority of the upstream link and the downstream link; or, the control unit may control the wireless relay device to transmit in a downlink time slot of the upstream link control unit based on the information used to indicate prohibiting transmitting in an uplink time slot of the upstream link, or, the control unit may determine maximum transmitting power allowed on the upstream link or the downstream link of the wireless relay device based on the information used to indicate the allowed maximum total radiated power TRP when the wireless relay device transmits on the upstream link or the downstream link; or, the control unit may determine the maximum transmitting power allowed on the upstream link or the downstream link of the wireless relay device based on the information used to indicate the allowed maximum equivalent isotropic radiated power EIRP when the wireless relay device transmits on the upstream link or the downstream link; or, the control unit may adjust actual transmitting power on the upstream link or the downstream link of the wireless relay device based on the information used to indicate that the wireless relay device is required to adjust the transmitting power on the upstream link or the downstream link; or, the control unit may determine the modulation mode on the upstream link or the downstream link of the wireless relay device based on the information used to indicate the modulation mode allowed on the upstream link or the downstream link of the wireless relay device.

As an example, the wireless relay device may further include: a request message receiving unit (not shown) used to receive a request message requesting the information used to indicate the capability of the wireless relay device from the upstream wireless relay device or the base station, wherein the capability information obtaining unit obtains the information used to indicate the capability of the wireless relay device in response to the request message.

As an example, the request message may be used to request: information used to indicate a capability of the wireless relay device in at least one specified operation condition or scenario.

As an example, the request message may be carried on a broadcast signaling or a radio resource configuration RRC message.

As an example, the control information may be carried on one of a broadcast signaling, a RRC message, and media intervention control information.

As an example, the wireless relay device may be an Integrated Access and Backhaul IAB device.

Embodiment VI

FIG. 4 shows a block diagram of a device for controlling a wireless relay device according to an exemplary embodiment of the present disclosure. Here, the device may be a wireless relay device or a base station.

As shown in FIG. 4, the device for controlling a wireless relay device according to the exemplary embodiment of the present disclosure includes: a capability information receiving unit 40, a control information generating unit 50 and a control information transmitting unit 60.

Specifically speaking, the capability information receiving unit 40 is used to receive information used to indicate a capability of the wireless relay device from the wireless relay device.

The control information generating unit 50 is used to generate control information used to control communication of the wireless relay device based on the information.

The control information transmitting unit 60 is used to transmit the control information to the wireless relay device.

As an example, the control information may be used to control at least one of: an upstream link or a downstream link of the wireless relay device, and a cell search method about the upstream link of the wireless relay device, wherein the downstream link is a communication link between the wireless relay device and a downstream wireless relay device or user equipment, and the upstream link is the communication link between the wireless relay device and the device.

As an example, the information used to indicate the capability of the wireless relay device may include: information used to indicate a communication capability of the wireless relay device or information used to indicate a mobility capability of the wireless relay device.

As an example, the information used to indicate the communication capability of the wireless relay device may include at least one of: information used to indicate a capability related to duplex or frequency band supported by the wireless relay device and information used to indicate a capability related to transmitting power of the wireless relay device; or, the information used to indicate the mobility capability of the wireless relay device may include at least one of: information used to indicate whether mobility is supported, information used to indicate a moving speed capability, and information used to indicate a capability to measure an adjacent cell.

As an example, the control information generating unit 50 may generate information used to control a radio resource allocation based on the information used to indicate the capability related to duplex or frequency band supported by the wireless relay device or the information used to indicate the capability related to the transmitting power of the wireless relay device; or, the control information generating unit 50 may generate information used to control transmitting power or a modulation mode based on the information used to indicate the capability related to duplex or frequency band supported by the wireless relay device or information used to indicate the capability related to transmitting power of the wireless relay device mode; or, the control information generating unit 50 may generate information used to control a measurement number or a measurement period with respect to an adjacent cell on the upstream link based on the information used to indicate the mobility capability of the wireless relay device.

As an example, the information used to control the radio resource allocation may include at least one of: information used to indicate frequency resources allowed to be used by the upstream link; information used to indicate frequency resources allowed to be used by the downstream link; information used to indicate allowed transmission or reception timing of the upstream link and the downstream link; information used to indicate at least one of allowed uplink and downlink timing, a uplink and downlink limitation, and a uplink and downlink priority on the upstream link; information used to indicate at least one of allowed uplink and downlink timing, a uplink and downlink limitation, and a uplink and downlink priority on the downstream link; information used to indicate a priority of the upstream link and the downstream link; and information used to indicate prohibiting transmitting in an uplink time slot of the upstream link.

As an example, the information used to control the transmitting power or the modulation mode may include at least one of: information used to indicate allowed maximum total radiated power TRP when the wireless relay device transmits on the upstream link or the downstream link; information used to indicate allowed maximum equivalent isotropic radiated power EIRP when the wireless relay device transmits on the upstream link or the downstream link; information used to indicate that the wireless relay device is required to adjust the transmitting power on the upstream link or the downstream link; and information used to indicate a modulation mode allowed on the upstream link or the downstream link of the wireless relay device.

As an example, the device may further include: a request message transmitting unit (not shown) used to transmit a request message requesting the information used to indicate the capability of the wireless relay device to the wireless relay device.

As an example, the request message may be used to request: information used to indicate a capability of the wireless relay device in at least one specified operation condition or scenario.

As an example, the request message may be carried on a broadcast signaling or a radio resource configuration RRC message.

As an example, the control information may be carried on one of a broadcast signaling, a RRC message, and media intervention control information.

As an example, the information used to indicate the capability related to duplex or frequency band supported by the wireless relay device may include at least one of: information used to indicate the duplex type of the wireless relay device; information used to indicate a capability of simultaneously receiving or transmitting on the upstream link or the downstream link; information used to indicate a frequency operating band supported by the upstream link or the downstream link; and information used to indicate as an out of band or in band wireless relay device.

As an example, the information used to indicate the capability related to the transmitting power of the wireless relay device may include at least one of: information used to indicate whether controlling the transmitting power of the upstream link or the downstream link is supported; information used to indicate a range of the transmitting power supported on the upstream link or the downstream link; information used to indicate a range of the transmitting power supported by the whole wireless relay device; information used to indicate whether simultaneously transmitting on the upstream link and the downstream link is supported; information used to indicate whether the upstream link and the downstream link share a power resource pool; information used to indicate whether the wireless relay device shares a power resource pool among a plurality of cells covered thereby; information used to indicate a power back-off range of the upstream link or the downstream link with respect to a specific modulation mode; and information used to indicate a power back-off range of the whole wireless relay device with respect to the specific modulation mode.

It should be understood that the wireless relay device according to embodiment V of the present disclosure may perform the method for controlling the wireless relay device described with reference to FIG. 1, which is omitted here to avoid repetition.

It should be understood that respective units in the wireless relay device according to embodiment V of the present disclosure may be implemented as hardware components or software components. According to the processing performed by the defined respective units, those skilled in the art may implement the respective units using, for example, a Field Programmable Gate Array (FPGA) or an Application Specific Integrated Circuit (ASIC).

It should be understood that the device for controlling the wireless relay device according to embodiment VI of the present application may perform the method for controlling the wireless relay device described with reference to FIG. 2, which is omitted here to avoid repetition.

It should be understood that respective units in the device for controlling the wireless relay device according to embodiment VI of the present disclosure may be implemented as hardware components or software components. According to the processing performed by the defined respective units, those skilled in the art may implement the respective units using, for example, a Field Programmable Gate Array (FPGA) or an Application Specific Integrated Circuit (ASIC).

An exemplary embodiment of the present disclosure provides a computer-readable storage medium for storing a computer program, and when the computer program is performed by a controller, the above method for controlling the wireless relay device as described with reference to FIG. 1 is implemented. The computer-readable storage medium is any data storage device that can store data readout by a computer system. Examples of the computer-readable storage medium includes: a read-only memory, a random access memory, a CD-ROM, a storage tape, a floppy disk, an optical data storage device and a carrier (such as data transmission over the Internet via a wired or wireless transmission path).

The wireless relay device according to an exemplary embodiment of the present disclosure includes: a controller (not shown) and a storage (not shown), wherein the storage stores a computer program, and when the computer program is executed by the controller, the above method for controlling a wireless relay device as described in FIG. 1 is implemented.

Another exemplary embodiment of the present disclosure provides a computer-readable storage medium for storing a computer program, and when the computer program is executed by a controller, the above the above method for controlling a wireless relay device as mentioned in embodiment IV is implemented. The computer-readable storage medium is any data storage device that can store data readout by a computer system. Examples of the computer-readable storage medium includes: a read-only memory, a random access memory, a CD-ROM, a storage tape, a floppy disk, an optical data storage device and a carrier (such as data transmission over the Internet via a wired or wireless transmission path).

A base station according to an exemplary embodiment of the present disclosure includes: a controller (not shown) and a storage (not shown), wherein the storage stores a computer program, and when the computer program is executed by the controller, the above method for controlling a wireless relay device as mentioned in embodiment IV is implemented.

A wireless relay device according to another exemplary embodiment of the present disclosure includes: a controller (not shown) and a storage (not shown), wherein the storage stores a computer program, and when the computer program is executed by the controller, the above method for controlling a wireless relay device as mentioned in embodiment IV is implemented.

Although some exemplary embodiments have been displayed and described, it will be understood by those skilled in the art that the amendments may be made to these embodiments without departing from the principle and spirit of the present disclosure, and the scope of the present disclosure is defined in the claims and the equivalents thereof.

The invention claimed is:

1. A method performed by a wireless relay device, the method comprises:
   obtaining capability information of the wireless relay device, the capability information including first information on a capability related to a duplex supported by the wireless relay device, second information on a capability related to a transmitting power on an upstream link and a downstream link of the wireless relay device, and third information on a capability related to a mobility of the wireless relay device;
   transmitting the capability information to the upstream wireless relay device of the wireless relay device or a base station; and
   receiving control information generated based on the capability information from the upstream wireless relay device or the base station,
   wherein the control information is used to control communication of the wireless relay device, and
   wherein the third information includes information on whether mobility is supported, information on a moving speed, and information on measurement of an adjacent cell.

2. A method performed by a node, the method comprising:
   receiving capability information of a wireless relay device from the wireless relay device, the capability information including first information on a capability related to a duplex supported by the wireless relay device, second information on a capability related to a transmitting power on an upstream link and a downstream link of the wireless relay device, and third information on a capability related to a mobility of the wireless relay device;

generating control information generated based on the capability information and used to control communication of the wireless relay device; and transmitting the control information to the wireless relay device, wherein the node is one of the upstream wireless relay device of the wireless relay device or a base station wherein the third information includes information used to indicate whether mobility is supported, information on a moving speed, and information on measurement of an adjacent cell.

3. The method of claim 1, wherein control information used to control an allocating frequency resource used by the upstream link or a downstream link of the wireless relay device is generated based on the first information and the second information, wherein control information used to control a transmitting power or a modulation mode of the upstream link or the downstream link of the wireless relay device is generated based on the first information and the second information, and wherein control information used to control a measurement number or a measurement period with respect to the adjacent cell on the upstream link is generated based on the third information.

4. The method of claim 1, wherein the first information includes at least one of:
information on a duplex type of the wireless relay device, or
information on a simultaneously receiving or transmitting on the upstream link or the downstream link, and wherein the second information includes at least one of:
information on whether simultaneously transmitting on the upstream link and the downstream link is supported;
information on whether the upstream link and the downstream link share a power resource pool;
information on whether the wireless relay device shares a power resource pool among a plurality of cells covered thereby;
information on a power back-off range of the upstream link or the downstream link with respect to a specific modulation mode; or
information on a power back-off range of the whole wireless relay device with respect to the specific modulation mode.

5. The method of claim 3, wherein the allocating frequency resource used by an upstream link or a downstream link of the wireless relay device based on the control information includes at least one of:
determining an allowed range of an operating frequency of the upstream link of the wireless relay device based on information on frequency resources of the upstream link, or
determining an allowed range of an operating frequency of the downstream link of the wireless relay device based on information on frequency resources of the downstream link.

6. The method of claim 3, wherein the controlling the transmitting power or the modulation mode of the upstream link or the downstream link of the wireless relay device based on the control information includes at least one of:
determining maximum transmitting power allowed on the upstream link or the downstream link of the wireless relay device based on information on an allowed maximum total radiated power (TRP), determining maximum transmitting power allowed on the upstream link or the downstream link of the wireless relay device based on information on an allowed maximum equivalent isotropic radiated power (EIRP), adjusting actual transmitting power on the upstream link or the downstream link of the wireless relay device based on information on whether the wireless relay device is required to adjust the transmitting power on the upstream link or the downstream link, or determining the modulation mode on the upstream link or the downstream link of the wireless relay device based on information on modulation mode allowed on the upstream link or the downstream link of the wireless relay device.

7. The method of claim 2, wherein control information used to control an allocating frequency resource used by the upstream link or a downstream link of the wireless relay device is generated based on the first information and the second information, wherein control information used to control a transmitting power or a modulation mode of the upstream link or the downstream link of the wireless relay device is generated based on the first information and the second information, and wherein control information used to control a measurement number or a measurement period with respect to the adjacent cell on the upstream link is generated based on the third information.

8. The method of claim 2, wherein the first information includes at least one of:
information on a duplex type of the wireless relay device, or
information on a simultaneously receiving or transmitting on the upstream link or the downstream link, and wherein the second information includes at least one of:
information on whether simultaneously transmitting on the upstream link and the downstream link is supported,
information on whether the upstream link and the downstream link share a power resource pool,
information on whether the wireless relay device shares a power resource pool among a plurality of cells covered thereby,
information on a power back-off range of the upstream link or the downstream link with respect to a specific modulation mode, or
information on a power back-off range of the whole wireless relay device with respect to the specific modulation mode.

9. The method of claim 7, wherein the allocating frequency resource used by an upstream link or a downstream link of the wireless relay device based on the control information includes at least one of:
determining an allowed range of an operating frequency of the upstream link of the wireless relay device based on information on frequency resources of the upstream link, or
determining an allowed range of an operating frequency of the downstream link of the wireless relay device based on information on frequency resources of the downstream link.

10. The method of claim 7, wherein the controlling the transmitting power or the modulation mode of the upstream link or the downstream link of the wireless relay device based on the control information includes at least one of:

determining maximum transmitting power allowed on the upstream link or the downstream link of the wireless relay device based on information on an allowed maximum total radiated power (TRP), determining maximum transmitting power allowed on the upstream link or the downstream link of the wireless relay device based on information on an allowed maximum equivalent isotropic radiated power (EIRP), adjusting actual transmitting power on the upstream link or the downstream link of the wireless relay device based on information on whether the wireless relay device is required to adjust the transmitting power on the upstream link or the downstream link, or determining the modulation mode on the upstream link or the downstream link of the wireless relay device based on information on modulation mode allowed on the upstream link or the downstream link of the wireless relay device.

11. A wireless relay device, comprising:

a storage; and a controller configured to:

obtain capability information of the wireless relay device, the capability information including first information on a capability related to a duplex supported by the wireless relay device, second information on a capability related to a transmitting power on an upstream link and a downstream link of the wireless relay device, and third information on a capability related to a mobility of the wireless relay device, transmit the capability information to the upstream wireless relay device of the wireless relay device or a base station, and receive control information generated based on the capability information from the upstream wireless relay device or the base station, wherein the control information is used to control communication of the wireless relay device, and wherein the third information includes information used to indicate whether mobility is supported, information on a moving speed, and information on measurement of an adjacent cell.

12. The wireless relay device of claim 11, wherein control information used to control an allocating frequency resource used by the upstream link or a downstream link of the wireless relay device is generated based on the first information and the second information, wherein control information used to control a transmitting power or a modulation mode of the upstream link or the downstream link of the wireless relay device is generated based on the first information and the second information, and wherein control information used to control a measurement number or a measurement period with respect to the adjacent cell on the upstream link is generated based on the third information.

13. The wireless relay device of claim 11, wherein the first information includes at least one of:

information on a duplex type of the wireless relay device, or information on a simultaneously receiving or transmitting on the upstream link or the downstream link, and wherein the second information includes at least one of:

information on whether simultaneously transmitting on the upstream link and the downstream link is supported, information on whether the upstream link and the downstream link share a power resource pool, information on whether the wireless relay device shares a power resource pool among a plurality of cells covered thereby, information on a power back-off range of the upstream link or the downstream link with respect to a specific modulation mode, or information on a power back-off range of the whole wireless relay device with respect to the specific modulation mode.

14. The wireless relay device of claim 12, wherein the allocating frequency resource used by an upstream link or a downstream link of the wireless relay device based on the control information includes at least one of:

determining an allowed range of an operating frequency of the upstream link of the wireless relay device based on information on frequency resources of the upstream link, or determining an allowed range of an operating frequency of the downstream link of the wireless relay device based on information on frequency resources of the downstream link.

15. The wireless relay device of claim 12, wherein the controlling the transmitting power or the modulation mode of the upstream link or the downstream link of the wireless relay device based on the control information includes at least one of:

determining maximum transmitting power allowed on the upstream link or the downstream link of the wireless relay device based on information on an allowed maximum total radiated power (TRP), determining maximum transmitting power allowed on the upstream link or the downstream link of the wireless relay device based on information on an allowed maximum equivalent isotropic radiated power (EIRP), adjusting actual transmitting power on the upstream link or the downstream link of the wireless relay device based on information on whether the wireless relay device is required to adjust the transmitting power on the upstream link or the downstream link, or determining the modulation mode on the upstream link or the downstream link of the wireless relay device based on information on modulation mode allowed on the upstream link or the downstream link of the wireless relay device.

16. A node, comprising:

a storage; and a controller configured to:

receive capability information of a wireless relay device from the wireless relay device, the capability information including first information on a capability related to a duplex supported by the wireless relay device, second information on a capability related to a transmitting power on an upstream link and a downstream link of the wireless relay device, and third information on a capability related to a mobility of the wireless relay device, generate control information generated based on the capability information and used to control communication of the wireless relay device, and transmit the control information to the wireless relay device, wherein the node is one of the upstream wireless relay device of the wireless relay device or a base station, and wherein the third information includes information used to indicate whether mobility is supported, information on a moving speed, and information on measurement of an adjacent cell.

17. The node of claim 16,
wherein control information used to control an allocating frequency resource used by the upstream link or a downstream link of the wireless relay device is generated based on the first information and the second information,
wherein control information used to control a transmitting power or a modulation mode of the upstream link or the downstream link of the wireless relay device is generated based on the first information and the second information, and
wherein control information used to control a measurement number or a measurement period with respect to the adjacent cell on the upstream link is generated based on the third information.

18. The node of claim 16,
wherein the first information includes at least one of:
  information on a duplex type of the wireless relay device, or
  information on a simultaneously receiving or transmitting on the upstream link or the downstream link, and
wherein the second information includes at least one of:
  information on whether simultaneously transmitting on the upstream link and the downstream link is supported;
  information on whether the upstream link and the downstream link share a power resource pool;
  information on whether the wireless relay device shares a power resource pool among a plurality of cells covered thereby;
  information on a power back-off range of the upstream link or the downstream link with respect to a specific modulation mode; or
  information on a power back-off range of the whole wireless relay device with respect to the specific modulation mode.

19. The node of claim 17, wherein the allocating frequency resource used by an upstream link or a downstream link of the wireless relay device based on the control information includes at least one of:
  determining an allowed range of an operating frequency of the upstream link of the wireless relay device based on information on frequency resources of the upstream link, or
  determining an allowed range of an operating frequency of the downstream link of the wireless relay device based on information on frequency resources of the downstream link.

20. The node of claim 17, wherein the controlling the transmitting power or the modulation mode of the upstream link or the downstream link of the wireless relay device based on the control information includes at least one of:
  determining maximum transmitting power allowed on the upstream link or the downstream link of the wireless relay device based on information on an allowed maximum total radiated power (TRP),
  determining maximum transmitting power allowed on the upstream link or the downstream link of the wireless relay device based on information on an allowed maximum equivalent isotropic radiated power (EIRP),
  adjusting actual transmitting power on the upstream link or the downstream link of the wireless relay device based on information on whether the wireless relay device is required to adjust the transmitting power on the upstream link or the downstream link, or
  determining the modulation mode on the upstream link or the downstream link of the wireless relay device based on information on modulation mode allowed on the upstream link or the downstream link of the wireless relay device.

* * * * *